United States Patent [19]

Kenmochi et al.

[11] Patent Number: 5,487,106
[45] Date of Patent: Jan. 23, 1996

[54] COMMUNICATION APPARATUS CAPABLE OF UTILIZING PORTABLE DEVICE

[75] Inventors: Toshio Kenmochi; Masao Kiguchi, both of Yokohama, Japan

[73] Assignee: Canon Kabushiki Kaisha, Tokyo, Japan

[21] Appl. No.: 207,111

[22] Filed: Mar. 8, 1994

Related U.S. Application Data

[63] Continuation of Ser. No. 633,303, Dec. 24, 1990, abandoned.

[30] Foreign Application Priority Data

Dec. 26, 1989 [JP] Japan ..................... 1-339204

[51] Int. Cl.⁶ .......................... H04M 11/00; H04M 1/00
[52] U.S. Cl. .......................... 379/100; 358/440; 379/93; 379/97; 379/357
[58] Field of Search ................. 379/93, 95, 96, 379/97, 98, 100, 355, 357; 358/440, 441

[56] References Cited

U.S. PATENT DOCUMENTS

| | | | |
|---|---|---|---|
| 4,113,991 | 9/1978 | Gorham et al. | 379/100 |
| 4,625,276 | 11/1986 | Benton et al. | 379/357 X |
| 4,821,107 | 4/1989 | Naito et al. | 358/256 |
| 4,833,705 | 5/1989 | Kobayashi | 379/93 |
| 4,900,902 | 2/1990 | Sakakibara | 379/357 X |
| 4,961,217 | 10/1990 | Akiyama | 379/89 |
| 5,099,512 | 3/1992 | Shigami et al. | 379/357 |
| 5,283,820 | 2/1994 | Ishiwatari et al. | 379/355 X |

FOREIGN PATENT DOCUMENTS

| | | |
|---|---|---|
| 115240 | 8/1984 | European Pat. Off. . |
| 3405448 | 8/1985 | Germany . |
| 58-69163 | 4/1983 | Japan . |
| 59-045755 | 3/1984 | Japan . |
| 59-110258 | 6/1984 | Japan . |
| 60-163175 | 8/1985 | Japan . |
| 62-276939 | 12/1987 | Japan . |
| 0011451 | 1/1989 | Japan ..................... 379/357 |
| 1245756 | 9/1989 | Japan . |
| 0185955 | 8/1991 | Japan ..................... 379/357 |
| 2211695 | 7/1989 | United Kingdom . |

*Primary Examiner*—Jeffery A. Hofsass
*Assistant Examiner*—Harry S. Hong
*Attorney, Agent, or Firm*—Fitzpatrick, Cella, Harper & Scinto

[57] ABSTRACT

There is provided a data communicating apparatus such as a facsimile which can use a portable device such as a card-like electronic telephone directory. The apparatus comprises: a receiver to receive a signal from the portable device; a data communicating circuit; a designating device to designate a data communicating mode of the data communicating circuit; a capturing circuit to capture a line; and a controller for driving the capturing circuit so as to capture the line in accordance with a predetermined signal received by the receiver, for transmitting the dial signal to the line, and for controlling the data communicating circuit in accordance with the data communicating mode designated by the designating device. The use functions of the communicating apparatus can be limited from the portable device.

10 Claims, 4 Drawing Sheets

COMMUNICATION APPARATUS CAPABLE OF UTILIZING PORTABLE DEVICE

This application is a continuation of application Ser. No. 07/633,303 filed Dec. 24, 1990, now abandoned.

BACKGROUND OF THE INVENTION

1. Field of the Invention

The present invention relates to a communicating apparatus for executing communication according to data received from a portable device.

2. Related Background Art

A conventional electronic telephone directory has a function for off-hooking a handset of a telephone and transmitting a dial number as a PB (push button tone) to a transmitter, thereby executing an originating call.

However, in a communicating apparatus having various functions, such as a facsimile apparatus, if only a dial number is received, the functions cannot be sufficiently used.

SUMMARY OF THE INVENTION

It is an object of the invention to improve the operating efficiency of a communicating apparatus.

Another object of the invention is to improve a data communicating apparatus.

Still another object of the invention is to provide a communicating apparatus in which when a predetermined signal is received from a portable device, a line is captured, a dial signal is transmitted, and after that, communication is executed in a communicating mode which was designated by an operation unit of the apparatus main body or the portable device.

Another object of the invention is to enable the use of a communicating apparatus to be limited from a portable device.

Other objects features and advantages of the present invention will become apparent from the following detailed description and the appended claims with reference to the accompanying drawings.

DETAILED DESCRIPTION OF THE PREFERRED EMBODIMENTS

According to one embodiment, code data which was received from an originating call side, and code data which was received from a portable electronic telephone directory, are compared upon reception. The call and communication according to the result of the comparison is executed.

On the other hand, according to the embodiment, a line is captured in accordance with information which was received from an electronic telephone directory and an originating call is executed, while data communication is performed in a communicating mode which was instructed from an operation unit.

Figure 1A:
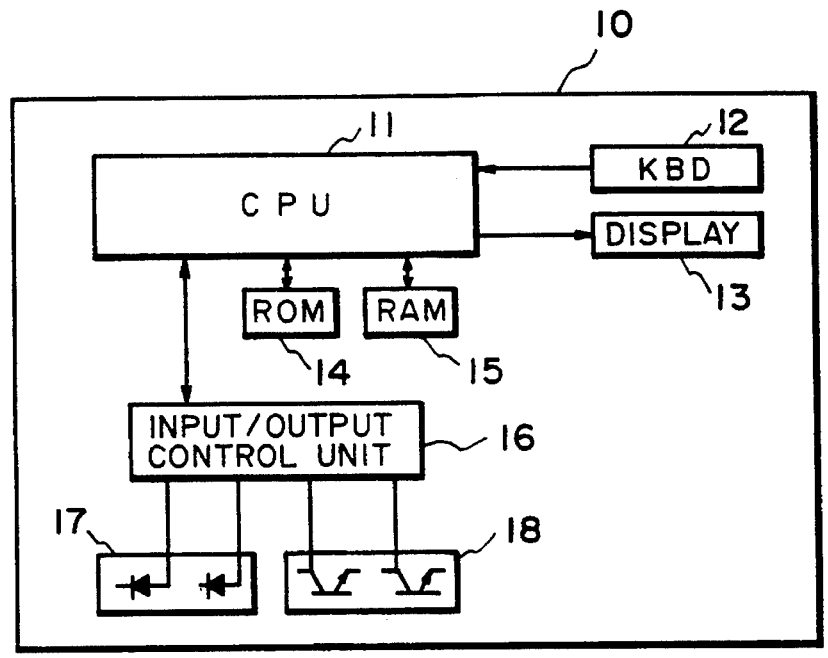
FIGS. 1a and 1b are block diagrams of an embodiment of the invention.
Figure 1B:
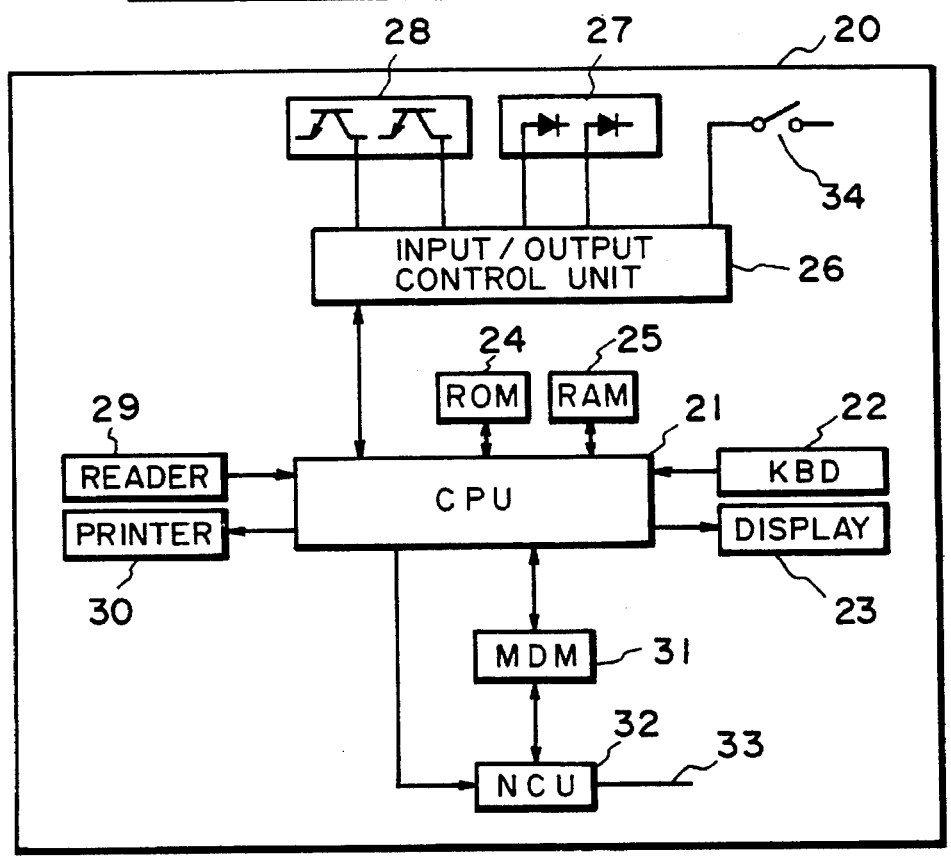

FIGS. 1a and 1b show block diagrams showing a construction of one embodiment of the invention. Reference numeral 10 denotes a portable card-like electronic telephone directory (hereinafter, abbreviated to a card) in which dial numbers, communicating modes, and the like have been stored; 11 indicates a CPU (central processing unit) for controlling the card 10; 12 a keyboard; 13 a display; 14 a ROM (read only memory) in which programs for controlling the card 10 and the like by the CPU 11 have been stored; 15 a RAM (random access memory); 16 an input/output (I/O) control unit; 17 a light emitting diode (LED); and 18 a photodiode. The I/O control unit 16 functions as a buffer for data transmission between the CPU 11 and the LED 17 and the photodiode 18. The card 10 and a facsimile apparatus 20 execute communication in conformity with the RS23C interface of the 4-line type. The LED 17 includes an LED to output transmission data and an LED to RS (reset) output. The photodiode 18 includes a photodiode to input reception data and a photodiode to RS input.

The facsimile apparatus 20 operates in accordance with information which was received from the card 10. Reference numeral 21 denotes a CPU to control the facsimile apparatus 20; 22 a keyboard; 23 a display; 24 a ROM in which programs to control the facsimile apparatus 20 by the CPU 21 and the like have been stored; 25 a RAM; 26 an I/O control unit; 27 an LED; 28 a photodiode; 29 a reader; 30 a printer; 31 a modem; 32 a line switching unit to connect the modem 31 to a line 33; and 34 a switch which is turned on when the card 10 is connected to the facsimile apparatus 20. The modem 31 modulates the image data which was read by the reader 29 and transmits to the line 33. On the other hand, the modem 31 demodulates the image signal which was received from the line 33 and records by the printer 30. The modem 31 also transmits and receives a facsimile procedure signal. The line switching unit 32 has a relay to transmit a dial pulse. A tone dialer to transmit a dial tone is provided in the modem 31 or the line switching unit 32. The I/O control unit 26 functions as a buffer for data transmission between the CPU 21 and the LED 27 and the photodiode 28. The LED 27 includes an LED to output transmission data and an LED to RS output. The photodiode 28 includes a photodiode to input reception data and a photodiode to RS input.

The transmission data outputting LED and the RS outputting LED of the LED 17 and the reception data inputting photodiode and the RS inputting photodiode of the photodiode 18 in the card 10 are arranged so as to face the reception data inputting photodiode and the RS inputting photodiode of the photodiode 28 and the transmission data outputting LED and the RS outputting LED of the LED 27 in the facsimile apparatus 20, respectively.

Figure 2:
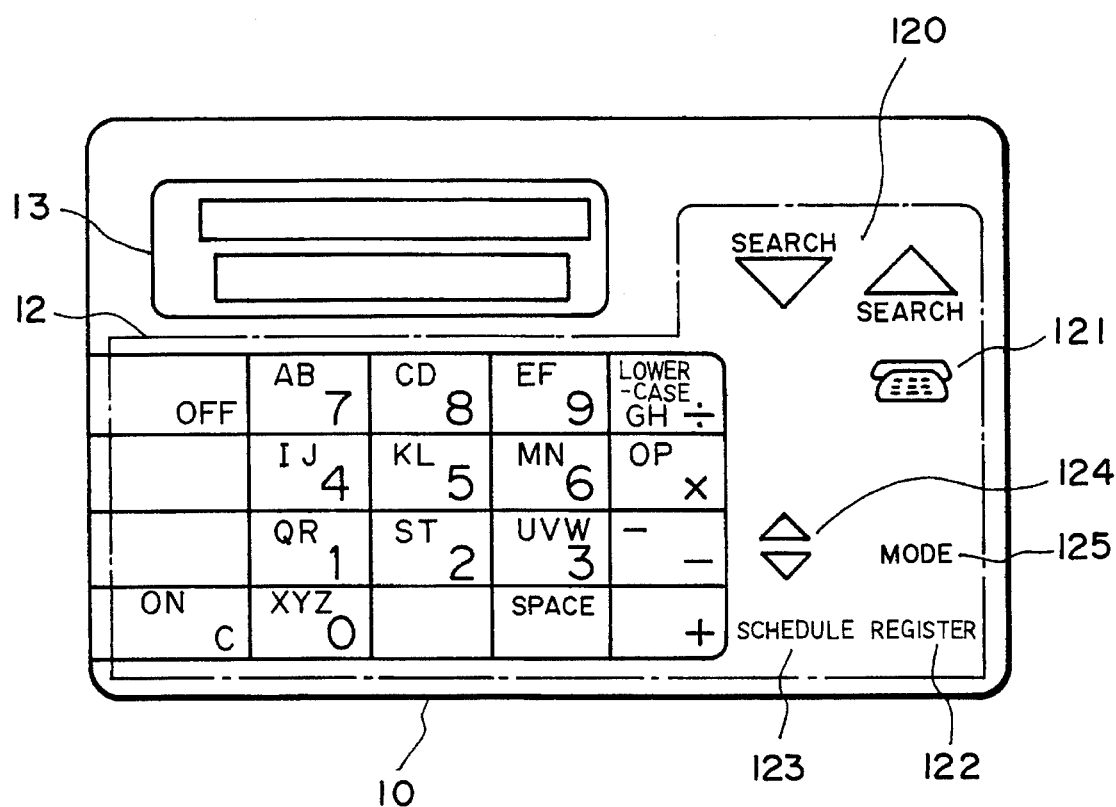
FIG. 2 is a plan view of a card in an embodiment of the invention.

FIG. 2 shows a plan view of the portable card 10 in the embodiment. Reference numeral 120 denotes a search key; 121 a telephone key; 122 a registration key; 123 a schedule key; 124 a cursor movement key; and 125 a mode switching key. Those keys are provided in the keyboard 12. Reference numeral 13 denotes a display.

Figure 3:
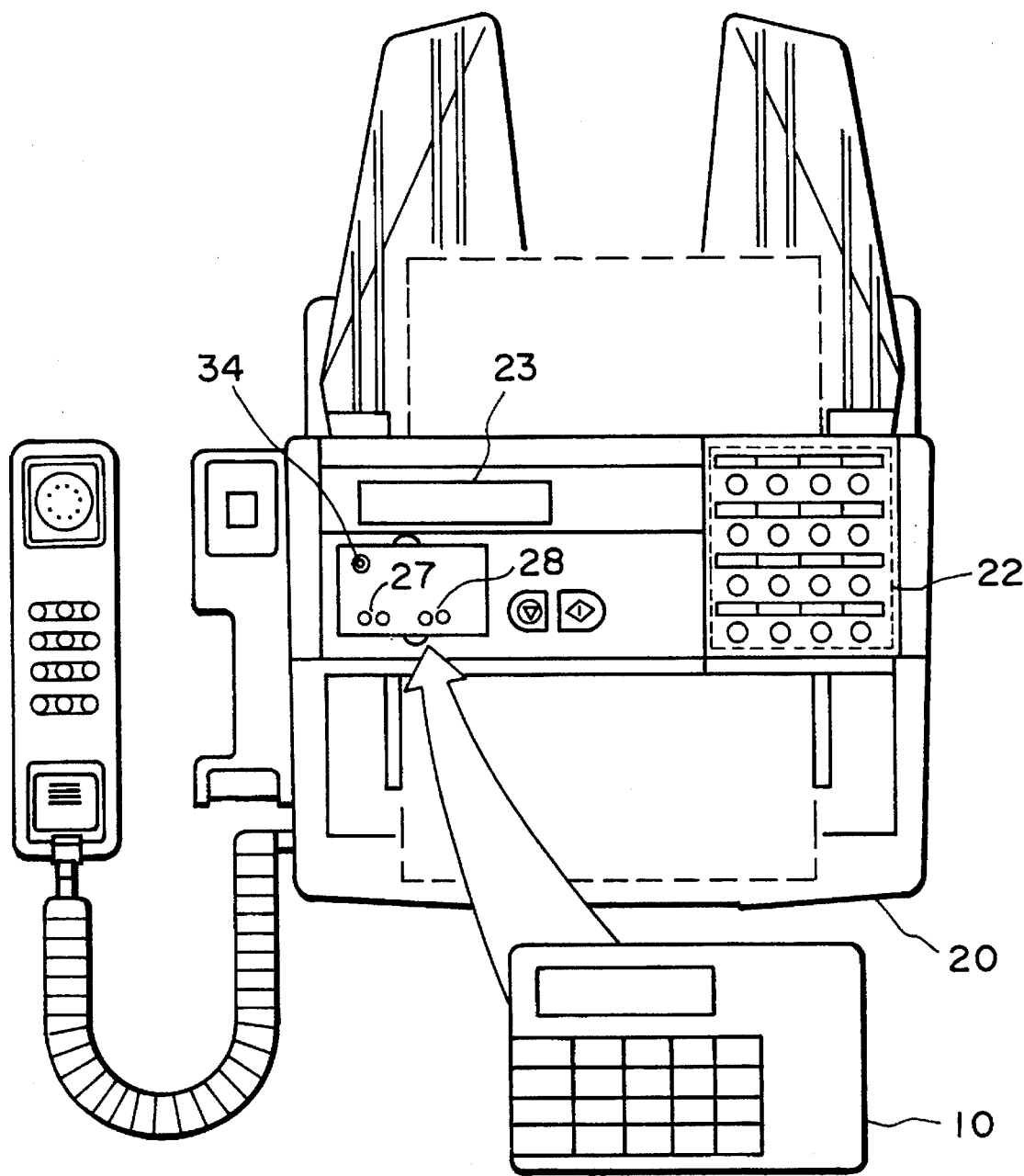
FIG. 3 is a plan view of a facsimile apparatus in an embodiment of the invention.

FIG. 3 is a plan view of a facsimile apparatus according to the embodiment. In FIG. 3, the parts and components which are common to those shown in FIGS. 1a and 1b are designated by the same reference numerals and their descriptions are omitted.

In this embodiment, the communication between the card 10 and the facsimile apparatus 20 is executed by the light.

If the communication is executed by an electric signal, it is necessary to mechanically connect connectors, so that it is necessary to accurately match the positions of the connectors.

On the other hand, there is a case where the connectors are often mechanically damaged if they are connected and disconnected many times. However, according to this embodiment, by executing the communication by using the LEDs and the photodiodes, even if the connecting positions of the card 10 and the facsimile apparatus 20 are slightly deviated, the communication can be performed. Therefore, since the communication between the card 10 and the facsimile apparatus 20 is executed in a contactless manner, they are not mechanically damaged. If the communication is performed by an audio signal such as a push button tone or the like, a malfunction may easily occur due to noise. Moreover, the conversion from the audio signal to the electric signal, such as in a discrimination of a frequency or the like, is troublesome. On the other hand, according to this embodiment, the external light can be relatively easily shut off as compared with the case of the sound. The light can easily be converted into the electric signal by using a small photoelectric converting element.

Explanation will now be made hereinbelow with respect to an example in which the communication between the card 10 and the facsimile apparatus 20 is executed by the light. However, it can be also executed by the electric signal.

Further, explanation will be made hereinbelow with respect to an example in which the communication between the card 10 and the facsimile apparatus 20 is executed by a serial communication. However, it can be also performed by parallel communications.

First, a procedure to register data into the RAM 15 of the card 10 by using the keyboard 12 will now be explained. The denomination of a communication destination is first input by the keyboard 12. Then, a cursor is moved to the lower stage by the cursor movement key 124, shown in FIG. 2, the dial number of the communication destination is input, and the registration key 122 is depressed. On the other hand, the CPU 11 displays the denomination of the communication destination to the upper stage of the display 13 and also displays the dial number to the lower stage of the display 13 in response to the depression of the keyboard 12. When the registration key 122 is depressed, the display content of the display 13 is registered into the RAM 15.

When the schedule key 123 is depressed, the schedule mode is set. The schedule name is displayed in the upper stage of the display 13 and the date is displayed in the lower stage. The schedule name and the date are registered into the RAM 15 by depressing the registration key 122.

To initialize the card, the user name, card number (ID), and division number (ID) are previously registered into the RAM 15 by using the operating unit 12.

The communication which is executed by the facsimile apparatus 20 using the card 10 will now be described.

In the facsimile apparatus 20, the dial numbers and the denominations have been stored in the RAM 25 in correspondence to the one-touch dial keys of the keyboard 22. Further, the initial communication speed, discrimination result regarding whether the facsimile apparatus is a mini facsimile apparatus or not, international communication confidential command, main box number, and trunk multiple address command (or relayed same message transmission command), have been stored in the RAM 25 as necessary. The polling ID (identification number) and the closed network ID for closed-area connection have been stored in the RAM 25.

When the card 10 is set into the facsimile apparatus 20, the switch 34 is turned on.

When the switch 34 is turned on, the CPU 26 of the facsimile apparatus 20 discriminates whether the RS outputting LED of the LED 17 of the card 10 is in a READY state (state in which the initial data can be transmitted: the LED is off in this case) or not on the basis of a state of the RS inputting photodiode of the photodiode 28. If the RS outputting LED is READY, the CPU 26 sends an initial data request command from the transmission data outputting LED of the LED 27.

When the CPU 11 of the card 10 receives the initial data request command from the reception data inputting photodiode of the photodiode 18, the CPU 11 transmits an ACK (normal reception report code) and the initial data by the transmission data outputting LED of the LED 17. As initial data, there can be mentioned the memory capacity, polling ID, closed network ID, user name, card ID, division ID (or department ID), class information, mail box number, mail box pass-word (personal identification number), facsimile ID, formated sentences (or fixed messages), one-touch dial key information, etc. The card 10 transmits that data in accordance with a predetermined format. On the other hand, the CPU 11 of the card 10 displays a message indicating that the initial data is being transmitted by the display 13 during the transmission of the initial data.

When the CPU 21 of the facsimile apparatus 20 receives the initial data which was transmitted from the card 10 in response to the initial data request command in accordance with a predetermined format, the CPU 21 returns an ACK (normal reception report code) from the transmission data outputting LED of the LED 27 to the card 10. On the other hand, if the initial data cannot be normally received, the CPU 21 returns an NACK (abnormal reception report code).

The CPU 11 of the card 10 waits until the facsimile apparatus 20 discriminates whether the response to the initial data is ACK or NACK and, if it is ACK, a command from the operator is input by the keyboard 12 or a command from the facsimile apparatus 20 is input by the photodiode 18. On the other hand, if the respond is NACK, the CPU 11 returns the initial data to the facsimile apparatus 20. The CPU 11 of the card 10 returns the initial data until the ACK is returned from the facsimile apparatus 20.

As mentioned above, in this embodiment, if the facsimile apparatus 20 detects by the switch 34 that the card 10 has been set, the facsimile apparatus 20 sends an initial data transmission request to the card 10. That is, if the card 10 has been set into the facsimile apparatus 20, the initial data is set from the card 10 into the facsimile apparatus 20 without executing key operations such as to set the initial data from the card 10 to the facsimile apparatus 20 by the user.

Therefore, it is possible to prevent a situation where the user forgets to set the initial data and the initial data is not set. In addition, the operation to set the initial data can be omitted.

When the initial data which was transmitted from the card 10 cannot be normally received, the facsimile apparatus 20 requests the retransmission of the initial data until it can be normally received, thereby enabling the initial data to be certainly set. It is sufficient to add a check code to the initial data or the like in order to discriminate whether the initial data could be normally received or not.

The card 10 displays a message indicating that the initial data is being transmitted during its transmission. If a key input of the keyboard 12 cannot be accepted during the transmission of the initial data because of a limitation of the processing capability of the card 10, such a fact can be relayed to the user. Therefore, the user can operate the keyboard 12 after he has confirmed the end of the transmission of the initial data.

The user name, included in the initial data, is used to add as transmission side information to transmission image and to transmit upon transmission. On the other hand, the card ID land the division ID are used so that the CPU 21 collects the using state of the facsimile apparatus 20 every card or every division and outputs a communication management report from the printer 30. The formated sentences are such that "Thank you for a good relationship.", "Thank you for your continued cooperation." and the like are added into a transmission image in a manner similar to the user name and are transmitted.

On the other hand, if the user determines that the initial data is unnecessary, he can also set the operating mode to a mode such that the facsimile apparatus 20 does not transmit the initial data request command.

(Mail box)

The facsimile ID which was transmitted as initial data by the card 10 constructs a pair together with the mail box number and the mail box pass-word and is used to determine from which one of the mail boxes in which facsimile apparatus the reception image is extracted.

If a reception call was received from the line 33 and a confidential communication was designated and the mail box number was sent before an image signal is sent, the CPU 21 of the facsimile apparatus 20 detects it by the modem 31 and stores the received image into the RAM 25 in correspondence to the mail box number.

When the initial data is received, the CPU 21 of the facsimile apparatus 20 compares the facsimile ID of the self station, which has previously been registered in the RAM 25, with the facsimile ID included in the received initial data. If they coincide, the pass-word corresponding to the mail box number included in the initial data is read out of the RAM 25 and compared with the mail box password included in the initial data. If they coincide, the received image is read out of the relevant mail box and output from the printer 30.

If a plurality of sets of facsimile ID, mail box number, and mail box pass-word were sent from the card 10, the CPU 21 discriminates which one of the facsimile ID among them coincides with the facsimile ID of the self station. If there is a coincident ID, a check is made to see if the mail box pass-word of the mail box number corresponding to the coincident facsimile ID is correct or not. If it is correct, the received image is read out of the relevant mail box and is printed out.

Therefore, according to this embodiment, an image can be extracted from the first mail box from a certain facsimile apparatus, while an image can be extracted from the second mail box from another facsimile apparatus. That is, the mail boxes of a plurality of facsimile apparatuses can be effectively used by a single card.

In an office using a plurality of facsimile apparatuses, if it has been predetermined in a manner such that the first mail box of each facsimile apparatus is used for a president and the second mail box is used for a department manager and the third mail box is used for a section chief, there is no need to register the facsimile ID, mail box number, and mail box pass-word in correspondence to each other. If the mail box number 1 and the mail box pass-word are sent from the card of the president, the facsimile ID can be ignored.

On the other hand, in the embodiment, the mail box pass-word and the like have been transmitted from the card 10 on the basis of the initial data request command when the card 10 was set in the facsimile apparatus 20. However, it is also possible to construct in a manner such that the facsimile apparatus 20 transmits a mail box pass-word request command on the basis of an instruction from the keyboard 22 of the facsimile apparatus 20, in a state in which the card 10 has been set into the facsimile apparatus 20, and the mail box pass-word and the like are transmitted from the card 10.

On the other hand, the facsimile apparatus 20 can be also constructed in a manner such that irrespective of a state in which the card 10 has been set into the facsimile apparatus 20 or not, the operator sets the operating mode into the mail box mode and inputs the mail box number and the mail box pass-word by the keyboard 22, thereby enabling the received image to be extracted. That is, when the mail box mode is set and the mail box number and the mail box pass-word are input by the keyboard 22, the CPU 21 reads out the pass-word corresponding to the input mail box number from the RAM 25 and compares with the mail box pass-word which was input by the keyboard 22. If they coincide, the received image is extracted from the mail box which is specified by the input mail box number and is printed out by the printer 30.

(Polling ID and closed network ID)

In the facsimile apparatus 20, the polling ID and closed network ID of the self station have previously been stored in the RAM 25.

On the other hand, when the initial data is received from the card 10, the polling ID and the closed network ID, which are included in the initial data, are stored into the RAM 25 separately from the polling ID and closed network ID of the self station which have previously been stored in the RAM 25.

When a reception call is received from the line 33 and the polling ID is subsequently received through the modem 31 when an original has been set to the reader 29, the CPU 21 compares the polling ID included in the initial data with the polling ID which was received from the modem 31 in the case where the card 10 has been set. If they coincide, the set original is read by the reader 29 and is modulated by the modem 31 and is transmitted. On the other hand, if the card 10 is not set, the CPU 21 compares the polling ID of the self station, which has previously been stored in the RAM 25, with the polling ID which was received from the modem 31. If they coincide, the image of the set original is transmitted. On the contrary, if they differ, the line is disconnected without transmitting the original image.

According to another embodiment of the invention, the CPU 21 discriminates whether the polling ID, which was received from the modem 31, coincides with the polling ID of the self station, which has previously been stored in the RAM, or the polling ID which was received from the card upon reception call. If they coincide, the original image is transmitted.

Discrimination regarding whether the card 10 has been set or not can be performed on the basis of the switch 34.

When a call is received from the line 33 and the closed network ID is subsequently received through the modem 31, if the card 10 has been set, the CPU 21 compares the closed network ID included in the initial data with the closed network ID which was received from the modem 31. If they differ, the line is disconnected. If they coincide, the image signal which was received from the line is demodulated by the modem 31 and is printed out from the printer 30. On the other hand, if the card is not set, the closed network ID of the self station which has previously been stored in the RAM 25 is compared with the closed network ID which was received from the modem 31. If they differ, the line is disconnected. If they coincide, the reception is continued.

On the other hand, in this embodiment, if the card 10 has been set, the closed network ID which had been received from the modem 31 has been compared with the polling ID included in the initial data. However, in another embodiment of the invention, if the card 10 has been set, the CPU 21 discriminates whether the closed network ID which was received from the modem 31 coincides with either the closed network ID of the self station, which has previously been stored in the RAM 25, or the closed network ID included in the initial data. If they coincide, the reception may be also executed.

On the other hand, if no closed network ID has previously been stored in the RAM 25, if the card 10 is not set, the CPU 21 doesn't execute the comparison of the closed network IDs but prints out the received image when a call is received.

As mentioned above, according to this embodiment, by exchanging a desired card into one facsimile apparatus, it is possible to execute the communication with different partners.

On the other hand, although this embodiment has been described with respect to the polling ID and closed ID of the facsimile apparatus, the invention can be also applied to the case of refusing the reception of a digital telephone. (Use limitation)

The CPU 21 of the facsimile apparatus 20 limits the functions of the facsimile apparatus 20 in accordance with the class information which was received as initial data from the card 10. That is, the CPU 21 sets the permission or inhibition of the reception, permission or inhibition of the overseas transmission, permission or inhibition of the toll transmission, permission or inhibition of the local transmission, permission or inhibition of the half-tone transmission, and the permission or inhibition of the copy, in accordance with the class information which was received. In the case of limiting the functions of the facsimile apparatus in accordance with the class information, information regarding the limitation when no card is set has previously been set in the RAM 25.

In a state in which the card 10 has been set, if the dial number is input from the keyboard 22, the CPU 21 discriminates whether the dial number is an overseas dial number or a toll dial number and also discriminates whether the operating mode has been set to the half-tone mode or the copy mode or the like. The CPU 21 compares the input data with the class information which was received from the card 10, thereby judging the permission or inhibition of the transmission or the like. In this embodiment, the use limitation by the card 10 can be cancelled by operating a key of a special number of the keyboard 22.

In this embodiment, although the use limitation has been performed in accordance with the class information, it can be also executed in accordance with the division ID or card ID.

(One-touch dial key change)

The dial numbers, denominations, and communicating modes, as necessary, have previously been stored in the RAM 25 of the facsimile apparatus 20 in correspondence to the one-touch dial keys of the keyboard 22. If the card 10 is not set, the CPU 21 reads out the information corresponding to the operation of the one-touch key and executes the facsimile transmission.

On the other hand, if the one-touch dial key information is included in the initial data which was received from the card 10, such information is also registered in the RAM 25. If the one-touch key is operated in a state in which the card 10 has been set, the CPU 21 reads out the one-touch dial key information, included in the initial data from the RAM 25, and executes an originating call. Now, assuming that ten one-touch dial keys are provided in the keyboard 22 of the facsimile apparatus 20 as the one-touch dial key information, for instance, the dial number, denomination, and communicating mode if necessary, are transferred from the card 10 to the facsimile apparatus 20 in correspondence to each of the ten one-touch dial keys.

That is, if the one-touch key is depressed in a state in which the card 10 is not set, the CPU 21 reads out the dial number corresponding to the depressed one-touch key from the one-touch dial numbers which are peculiar to the apparatus and which have previously been stored in the RAM 25. On the basis of the readout dial number, the CPU 21 controls the modem 31 or the NCU 32 and transmits the dial signal to the line 33.

On the other hand, if the one-touch key is depressed in a state in which the card 10 has been set, the CPU 21 reads out the dial number corresponding to the depressed one-touch key from the one-touch dial numbers which were received from the card 10. On the basis of the readout dial number, the CPU 21 controls the modem 31 or NCU 32 and transmits the dial signal to the line 33.

Even in the case where the card 10 has been set, if the operator wants to transmit data on the basis of the dial number or the like which has previously been stored in the RAM 25, by instructing the mode switching by the keyboard 22 prior to operating the one-touch dial key, the data can be transmitted by the dial number or the like which has previously been stored in the RAM 25.

The CPU 21 discriminates whether the card 10 has been set or not by checking a state of the switch 34.

Although this embodiment has been described with respect to the one-touch dial keys, the invention can be also similarly applied to the case of using abbreviation dial keys.

The facsimile apparatus 20 has a function of an electronic telephone directory. The denominations, telephone numbers, and the like which were transferred from the card 10 are stored into the RAM 25. A desired denomination is searched by alphabet keys and a search key of the keyboard 22, and the facsimile transmission is executed to a desired partner. On the other hand, if the card 10 is not set, the denomination which is peculiar to the apparatus and which has previously been registered in the RAM 25 is searched by the search key. (Telephone directory mode)

The facsimile transmission using the dial number stored in the RAM 15 of the card 10 will now be described.

When the operator operates alphabet keys or the search key 120 of the keyboard 12, of the card 10, the CPU 11 reads out the data from the RAM 15 and displays the denomination of the partner in the upper stage of the display 13 and the dial number in the lower stage. When the operator depresses the telephone key 121 of the keyboard 12, the CPU 11 confirms that the RS outputting LED of the LED 27 of the facsimile apparatus 20 is in the READY state (standby mode: the LED is lit off) and, thereafter, the dial number and denomination which are being displayed by the display. 13 are transmitted by the transmission data outputting LED of the LED 17 in accordance with a predetermined format. On the other hand, if the communicating modes such as confidential transmission, trunk multiple address command (or relayed same message transmission command), mini-facsimile transmission, superfine transmission, and the like, and the formated sentences (or fixed messages) have been registered in the RAM 15 in correspondence to the dial numbers, those data are also sequentially transmitted.

Figure 4:
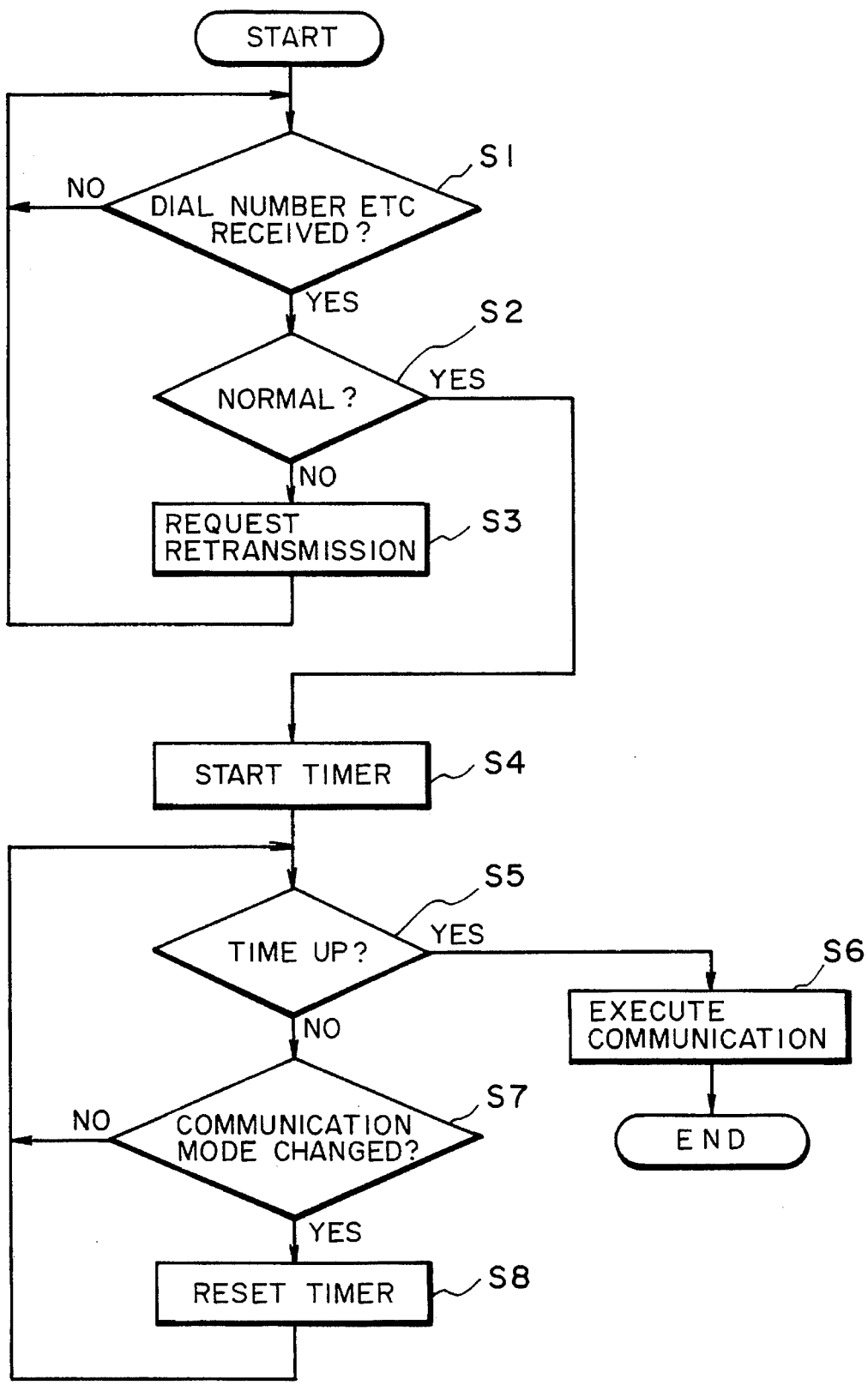
FIG. 4 is a flowchart when a communicating mode is changed according to an embodiment of the invention.

When the dial number and the like have been received from the reception data inputting photodiode of the photodiode 28 in accordance with a predetermined format, See FIG. 4, (step S1), the CPU 21 of the facsimile apparatus 20 returns an ACK (normal reception report code) from the transmission data outputting LED of the LED 27. If they cannot be correctly received (step S2), the CPU 21 returns an NACK (abnormal reception report code) and requests retransmission of the data (step S3). When the NACK is received, the CPU 11 of the card 10 again transmits the data such as dial number and the like.

When the dial number and the like have correctly been received, the CPU 21 controls the NCU 32, captures the line, and sends the dial number from the modem 31 to the line 33 in accordance with the dial number which was received from the card 10.

Further, when the partner responds, the facsimile communication is executed in accordance with the communicating mode which was received from the card 10. The partner (or destination) name which was received, is developed as a font, and added as initial data to the transmission image together with the received user name and dial number, and the resultant image data is transmitted.

In this embodiment, other communicating modes which are not registered in the card 10 can be input by the keyboard 22.

That is, when the communicating mode is received from the card 10, the CPU 21 executes the facsimile communication in accordance with a command from the keyboard 22 with respect to the conditions which are not sent from the card 10. Namely, if a command to confidentially transmit is not included in the communicating modes which were received from the card 10, if the operator has already set the confidential transmission from the keyboard 22 prior to transferring the dial number and the like, the CPU 21 executes the confidential transmission.

On the other hand, if a command to transmit in the superfine mode is included in the communicating modes which were received from the card 10, if the fine mode has been preset from the keyboard 22 of the facsimile apparatus 20, the command which is input by the keyboard 22 is ignored and the data is transmitted in the superfine mode. For instance, in the case where the facsimile apparatus 20 frequently transmits in the fine mode, the fine mode has generally been preset from the keyboard 22. However, to a partner of an apparatus to which data can be transmitted in the superfine mode, the data is transmitted in the superfine mode in accordance with a command from the card 10.

Further, in this embodiment, the communicating mode sent from the card 10 can be changed by the keyboard 22 of the facsimile apparatus 20.

In this embodiment, the CPU 21 displays the denomination, dial number, communicating mode, and the like which were sent from the card 10 by the display 23 for a predetermined period of time which is decided by an internal timer. For this period of time, the CPU 21 accepts a change in communicating mode from the keyboard 22.

That is, in this embodiment, if the CPU 21 confirms that the information could normally received from the card 10, the internal timer is started (step S4). The CPU 21 accepts a change in communicating mode by the keyboard 22 until the internal timer runs out of time and changes the display content. When the internal timer has run out of time (step S5), the CPU 21 executes the facsimile communication in the communicating mode displayed (step S6).

For instance, in the case where the operator knew from the display 23 that the superfine mode was designated from the card 10, if he determines that there is no need to transmit in the superfine mode as a result of the check of a transmission original, the operating mode can be changed to the fine mode by the keyboard 22 (step S7). When the keyboard 22 is operated (step S7), the CPU 21 resets the internal timer to determine a display time of the communicating mode (step S8). Therefore, it is possible to prevent a situation such that if the operating mode is frequently changed, the display time runs out of time during the instruction of a change in operating mode and the transmission is started.

As mentioned above, according to this embodiment, with respect to the communicating modes which are not included in the data which was transmitted from the card 10, the transmission is executed in accordance with the communicating mode which has been preset by the keyboard 22. On the other hand, if the communicating mode which was sent from the card 10 differs from the communicating mode which has been preset by-the keyboard 22, the communicating mode sent from the card 10 is preferentially used. On the other hand, if the keyboard 22 is operated after the communicating mode is received from the card 10, the communicating mode which is instructed by the keyboard 22 is preferentially used. By using the above method, the embodiment has the foregoing effects.

The facsimile apparatus 20 executes the facsimile communication in accordance with the communicating mode which was set as mentioned above.

That is, if the international communication has been instructed from the card 10, the initial communicating speed is set into the low speed mode. On the other hand, if the confidential command and the mail box number have been received from the card 10, the CPU 21 executes an originating call by the dial number which was received from the card 10. After that, the CPU 21 transmits a message indicating that the confidential transmission is executed to the partner and the mail box number through the modem 31 before the image signal is transmitted. After that, the image signal is confidentially transmitted. On the other hand, if the trunk multiple address has been instructed from the card 10, the CPU 21 instructs the trunk multiple address to the partner through the modem 31 and then transmits the image signal.

On the other hand, in the case where the formated sentence such as "Please let us have your response quickly" or the like has been received from the card 10, the CPU 21 adds the received formated sentence to a transmission image and transmitts the resultant image. The CPU 21 repetitively uses the formated sentences included in the foregoing initial data every transmission. However, the formated sentence which was received together with the dial number upon originating call is used when an originating call is performed by the received dial number and data is transmitted.

Therefore, there is no need to additionally write the formated sentences to the transmission original and the original is not made dirty. Further, in this embodiment, by discriminating whether the received formated sentence is repetitively used or not, the formated sentence can be properly added.

In the embodiment, this originating call has been executed in response to the depression of the telephone key 121 of the keyboard 12 of the card 10. On the other hand, in another embodiment of the invention, the originating call can be executed by setting the card 10 into the facsimile apparatus 20.

That is, when it is detected by the switch 34 that the card 10 has been set, the CPU 21 of the facsimile apparatus 20 sends a dial number request command by the LED 27 in place of sending an initial data request command. Information regarding whether the facsimile apparatus 20 sends the initial data request command or the dial number request command can be preset by the keyboard 22.

On the other hand, in addition to the telephone directory mode to search the dial number, the card 10 has a schedule mode to manage a schedule, time mode to display the time on the display 13, and a calculator mode to execute calculations according to the operations of numeral keys and calculation keys (addition key, subtraction key, multiplication key, division key) of the keyboard 12. Those modes are switched by operating the mode switching key 125 of the keyboard 12.

When the dial number request command is received from the facsimile apparatus 20, the CPU 11 of the card 10 discriminates whether or not the telephone directory mode has been set by the keyboard 12. In the case where the dial number request command was received when the operating mode is in the telephone directory mode and the dial number and the denomination are being displayed by the display 13, the CPU 11 sends the display content by the LED 17.

On the other hand, if the operating mode is not the telephone directory mode, that is, if the dial number and the denomination are not displayed, the CPU 11 sends a ready code by the LED 17.

Namely, in the case where the dial number is displayed on the display 13, the CPU 11 sends the dial number and the like on the assumption that the card 10 was set into the facsimile apparatus after the operator had searched the partner to be originating-called. Otherwise, the CPU 11 waits by assuming that the operator intends to search the transmission destination after the card 10 was set into the facsimile apparatus 20.

Therefore, in the case where the dial number of the partner has already been displayed before the operator sets the card 10 into the facsimile apparatus 20, an operation to depress the telephone key 121 can be further omitted. It is also possible to prevent a situation where the operator forgot to depress the telephone key 121, so that the facsimile transmission is not performed.

(Display on the card)

In this embodiment, the memory transmission can be performed. That is, after the original was read by the reader 29 and stored into the RAM 25, the CPU 21 captures the line 33, executes an originating call and performs the facsimile transmission. During the facsimile transmission, the second original to be transmitted to the second partner is read by the reader 29 and stored into the RAM 25. After completion of the preceding facsimile transmission, the facsimile transmission to the second partner can be executed.

When the second partner is designated from the card 10, to accept the change in communicating mode as mentioned above, the CPU 21 displays the communicating mode or the like for the second partner on the display 23. During the display, the CPU 21 allows the information regarding the facsimile transmission to the first partner to be displayed on the display 13 of the card 10.

That is, when the information regarding the facsimile transmission for the second partner is received from the card 10, the CPU 21 returns the ACK (normal reception report code). After confirming that the RS outputting LED of the LED 17 of the card 10 is in the READY state (standby mode of the reception: the LED is lit off), the CPU 21 transmits a display information input command and the display content from the transmission data outputting LED of the LED 27 to the card 10.

The CPU 11 of the card 10 displays the content corresponding to the received data on the display 13. As the information which is displayed on the display of the card 10 by the facsimile apparatus 20, there are the denomination of the transmission partner, generation of transmission errors, and the like.

As mentioned above, in this embodiment, in the case, where the transmission for the second partner is designated from the card 10 while the facsimile apparatus 20 is executing the facsimile transmission to the first partner, the denomination of the second partner, dial number, communicating mode, and the like are displayed on the display 23 of the facsimile apparatus 20. On the other hand, the information regarding the communication to the first partner is displayed on the display 13 of the card 10. The contents which are displayed on the display 13 of the card 10 and on the display 23 of the facsimile apparatus 20 can be also reversed.

In the case where an original is read by the reader 29 and stored into the RAM 25 in a receiving state of the facsimile apparatus 20, the CPU 21 allows the information regarding the transmission of the original which is read by the reader 29 to be displayed on the display 23. On the other hand, the CPU 21 allows the information regarding the partner, during the reception and the generation of errors, to be displayed on the display 13. In this case as well, the contents which are displayed on the displays of the card 10 and the facsimile apparatus 20 can be also reversed.

Therefore, according to this embodiment, by displaying different information on two displays, sufficient information can be provided to the operator.

On the other hand, in the case of setting the card 10 into a facsimile apparatus without a display and using, the facsimile apparatus allows the operating mode such as transmitting state, receiving state, copying state, or the like or the information regarding the communication partner to be displayed on the display 13 of the card 10.

(Print out of schedule)

As described above, although the card 10 has the function to manage the schedule, the display 13 has a display area of only two lines and can display only one schedule name and the date at a time. On the other hand, according to the embodiment, many schedules can be simultaneously confirmed by printing out them from the printer 30 of the facsimile apparatus 20.

That is, when the print-out of the schedules is instructed from the keyboard 22 of the facsimile apparatus 20, the CPU 21 instructs the card 10 to output the schedule data by the LED 27. When such an instruction is detected by the photodiode 18, the CPU 11 of the card 10 reads out the schedule data from the RAM 15 and outputs from the LED 17. The CPU 21 of the facsimile apparatus 20 receives the schedule data by the photodiode 28 and stores it into the RAM 25. After that, the schedule data is font developed and printed out from the printer 30.

If the capacity of the RAM 25 to store the schedule data is insufficient, the CPU 21 divides the schedule data into a plurality of data and outputs to the CPU 11 of the card 10. That is, when the CPU 21 instructs the card 10 to output the schedule data, the CPU 21 adds an amount of data to be output at a time. The CPU 11 outputs the schedule data of an amount which is equal to or less than the data amount instructed. When the ACK (normal reception report code) is returned from the facsimile apparatus 20, the CPU 11 outputs the next schedule data.

Although the embodiment has been described with respect to the schedule data, processings can be also similarly executed with respect to the data such as telephone number or the like stored in the card 10.

(Data transfer from the facsimile apparatus to the card)

Although the embodiment has been described above with respect to the case of transferring data from the card 10 to the facsimile apparatus 20, an example in which data is transferred from the facsimile apparatus 20 to the card 10 will now be described.

It is desirable to miniaturize the card 10 so as not to occupy a large space upon carrying. However, if the card 10 is too miniaturized, the sizes of keys of the keyboard 12 are reduced and it becomes difficult to operate the keys of the keyboard 12 as compared with the keys of the facsimile apparatus. In consideration of the above point, in this embodiment, data can be registered from the facsimile apparatus 20 to the card 10.

On the other hand, in this embodiment, since the number of keys is limited, due to a request for miniaturization as mentioned above, a plurality of functions are commonly used by a single key. On the other hand, as already described above, many kinds of data have been stored in the card 10 of this embodiment. However, if too many functions are commonly provided for a single key in order to register many kinds of data, the operations become complicated. In consideration of this drawback, in this embodiment, the number of kinds of data which can be registered from the keyboard 12 of the card 10 into the RAM 15 is limited. Data which cannot be registered from the keyboard 12 is registered from the keyboard 22 of the facsimile apparatus 20.

Further, in this embodiment, the data which has previously been stored in the RAM 25 of the facsimile apparatus 20 is read out of the RAM 25 by the CPU 21 in accordance with a command from the keyboard 22 and is transferred to the RAM 15 of the card 10. Therefore, the information which has previously been registered in the facsimile apparatus 20 can be registered to the card 10 by a simple operation.

In this embodiment, the polling ID, closed network ID, class information, mail box number, mail box pass-word, facsimile ID, and communicating mode are registered into the RAM 15 by the keyboard 22 of the facsimile apparatus 20. The function to register those information is not provided for the keyboard 12 of the card 10. For instance, when the operator operates the keyboard 22 of the facsimile apparatus 20 and sets the operating mode into a mode to register the polling ID to the card 10 and subsequently detects the input of the polling ID, the CPU 21 sends a polling ID Input command from the LED 27 and then sends the polling ID. When the polling ID Input command and the polling ID are received from the photodiode 18, the CPU 11 of the card 10 registers the received polling ID into the RAM 15.

The same shall also apply to the other information such as closed network ID or the like.

The user name, card ID, division ID, and the like can be also similarly registered from the facsimile apparatus 20 to the card 10.

On the other hand, if the card doesn't have a keyboard, all of data are registered from the facsimile apparatus 20.

In this embodiment, although the dial number and the denomination can be registered from the keyboard 12 of the card 10 to the RAM 15, the communicating mode has been registered from the keyboard 22 of the facsimile apparatus 20. In the case of registering the communicating mode, the operator first operates the keyboard 12 to thereby allowing the denomination and dial number of a partner to whom the operator desires to register the communicating mode to be displayed on the display 13. By operating the keyboard 22 of the facsimile apparatus 20, the mode to register the communicating mode is set and the communicating mode such as fine mode, confidential mode, or the like is input. In correspondence to the input communicating mode, the CPU 21 transfers the communicating mode which was input from the keyboard 22 to the card 10. The CPU 11 of the card 10 registers the received communicating mode into the RAM 15 in correspondence to the denomination and the dial number which are being displayed on the display 13.

On the other hand, in the case where the dial number, denomination, communicating mode, and the like have already been registered in the RAM 25 of the facsimile apparatus 20, the keyboard 22 operated and those data are read out of the RAM 25. Then, by depressing the transfer key to the card, the CPU 21 transfers the designated data to the card 10 and registers into the RAM 15.

In this embodiment, the data formats for transmission and reception are common.

Further, as an application example, data such as dial number and the like, stored in the facsimile apparatus 20, is transferred to the card 10 and, further, that data can be transferred from the card 10 to another facsimile apparatus. Therefore, such an application example is effective in the case of exchanging the old facsimile apparatus or additionally buying another new facsimile apparatus.

In this case, if the operator tries to transfer a large quantity of data, there is a case where the capacity of the RAM 15 of the card 10 lacks. If the CPU 11 determines that the transfer data cannot be fully stored into the RAM 15, a message indicating such a fact is displayed on the display 13. On the other hand, in the case where the data which has already been stored will be erased if data is written into the RAM 15, a message indicating such a fact is also displayed.

If the CPU 21 of the facsimile apparatus 20 receives the memory capacity from the card 10 and determines the lack of memory capacity, a message indicating such a fact is displayed on the display 23.

After the CPU 21 decides that data can be transferred on the basis of a transfer permission signal which was output from the card 10, the data transfer is started.

As described above, in this embodiment, the code data received from the originating call side, and the code data received from the card 10 are compared upon reception call and the communication according to the result of the comparison is executed. Therefore, a method of coping with the case where the originating call side sent the code data can be set by the card 10. Thus, a method of coping with the code data upon reception can be executed without an erroneous input.

On the other hand, in this embodiment, the line is captured in accordance with the information which was received from the card 10 and an originating call is performed, while the communication is executed in the communicating mode which was input by the operating means. Therefore, the dial number is previously registered into the card 10 and, further, the communicating mode can be set to a proper mode each time the communication is performed.

Although the invention has been described above on the basis of the preferred embodiments, the invention is not limited to the above constructions of the embodiments but can be also applied to, for instance, a computer communication or the like according to a predetermined procedure.

What is claimed is:

1. A data transmission apparatus comprising:

receiving means for receiving transmission control data from a portable device;

dialing means for dialing a communication partner's number specified by the transmission control data; and transmitting means for transmitting confidential communication identification when confidential communication mode data is set in the transmission control data.

2. An apparatus according to claim 1, wherein said receiving means includes a photo-transistor.

3. An apparatus according to claim 1, wherein said transmitting means transmits facsimile data.

4. A portable device for a data transmission system, said portable device being used in connection with a data transmission apparatus, said portable device comprising:

memory means for storing transmission control data; and instruction means for instructing said data transmission apparatus to dial a communication partner's number specified by the transmission control data and to transmit confidential communication identification when confidential communication mode data is set in the transmission control data.

5. A device according to claim 4, wherein said instruction means includes light emitting means.

6. A communication system comprising:

a portable device including memory means for storing a plurality of sets of transmission control data, and searching means for searching a desired set of the transmission control data; and a data transmission apparatus including receiving means for receiving the transmission control data searched by said searching means, dialing means for dialing a communication partner's number specified by the transmission control data, and transmitting means for transmitting a confidential communication identification when a confidential communication is specified by the transmission control data.

7. A system according to claim 6, wherein said receiving means includes a photo-transistor.

8. A system according to claim 6, wherein said transmitting means transmits facsimile data.

9. A facsimile apparatus comprising:

receiving means for receiving a signal designating communication partner's number and a confidential communication mode command, from a portable device; and facsimile transmission means for transmitting a signal indicating confidential communication and including facsimile image data to the communication partner having the designated communication partner's number in response to the received signal and the confidential communication mode command from the portable device.

10. An apparatus according to claim 9, wherein the receiving means has a phototransistor.

* * * * *

UNITED STATES PATENT AND TRADEMARK OFFICE
CERTIFICATE OF CORRECTION

PATENT NO. : 5,487,106

DATED : January 23, 1996

INVENTOR(S) : TOSHIO KENMOCHI ET AL.

It is certified that error appears in the above-identified patent and that said Letters Patent is hereby corrected as shown below:

TITLE PAGE:

AT [56] REFERENCES CITED

Foreign Patent Documents,
    "1245756" should read --1-245756--.

COLUMN 1

Line 40, "objects" should read --objects,--.

COLUMN 2

Line 1, "instructed-from" should read
        --instructed from--.
    Line 17, "RS23C" should read --RS232--.
    Line 67, "the light." should read --light.--.

COLUMN 4

Line 40, "respond" should read --response--.

COLUMN 5

Line 6, "as" should be deleted and
        "to" should read --to a--.
    Line 8, "land" should read --and--.
    Line 65, "the" (2nd occurrence) should read --this--.

UNITED STATES PATENT AND TRADEMARK OFFICE
CERTIFICATE OF CORRECTION

PATENT NO. : 5,487,106

DATED : January 23, 1996

INVENTOR(S): TOSHIO KENMOCHI ET AL.

It is certified that error appears in the above-identified patent and that said Letters Patent is hereby corrected as shown below:

COLUMN 7

Line 23, "(Use" should read --¶ (Use--.

COLUMN 9

Line 1, "See" should read --see--.
    Line 36, "is-included" should read --is included--.
    Line 57, "received" should read --be received--.

COLUMN 10

Line 16, "by-the" should read --by the--.
    Line 45, "transmitts" should read --transmits--.
    Line 57, "the" should read --this-- and
    "this" should read --the--.

COLUMN 12

Line 39, "On" should read --On-- and
    "to the" should read --to this--.

COLUMN 13

Line 62, "allowing" should read --allow--.

UNITED STATES PATENT AND TRADEMARK OFFICE
CERTIFICATE OF CORRECTION

PATENT NO. : 5,487,106

DATED : January 23, 1996

INVENTOR(S) : TOSHIO KENMOCHI ET AL.

It is certified that error appears in the above-identified patent and that said Letters Patent is hereby corrected as shown below:

<u>COLUMN 14</u>

Line 39, "card 10" should read --card 10,--.

<u>COLUMN 16</u>

Line 10, "designating" should read --designating a--.

Signed and Sealed this

Second Day of July, 1996

Attest:

BRUCE LEHMAN

*Attesting Officer*  *Commissioner of Patents and Trademarks*